United States Patent
Paragaonkar et al.

(10) Patent No.: US 8,782,295 B2
(45) Date of Patent: *Jul. 15, 2014

(54) METHOD AND APPARATUS FOR A MULTI-ENGINE DESCRIPTOR CONTROLLER FOR DISTRIBUTING DATA PROCESSING TASKS ACROSS THE ENGINES

(71) Applicant: PMC-Sierra US, Inc., Sunnyvale, CA (US)

(72) Inventors: Chetan Paragaonkar, Bangalore (IN); Kuan Hua Tan, Coquitlam (CA)

(73) Assignee: PMC-Sierra US, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/093,162

(22) Filed: Nov. 29, 2013

(65) Prior Publication Data

US 2014/0095737 A1    Apr. 3, 2014

Related U.S. Application Data

(63) Continuation of application No. 13/288,619, filed on Nov. 3, 2011, now Pat. No. 8,601,169.

(60) Provisional application No. 61/409,843, filed on Nov. 3, 2010.

(51) Int. Cl.
*G06F 13/00*    (2006.01)
*G06F 9/30*    (2006.01)

(52) U.S. Cl.
USPC .......... 710/6; 710/7; 710/52; 710/53; 710/54; 370/394

(58) Field of Classification Search
USPC .............................................. 710/6, 7, 52–54
See application file for complete search history.

(56) References Cited

U.S. PATENT DOCUMENTS

| | | | |
|---|---|---|---|
| 5,884,059 A | 3/1999 | Favor et al. | |
| 7,072,342 B1 * | 7/2006 | Elnathan | 370/394 |
| 7,248,586 B1 | 7/2007 | Hughes, Jr. et al. | |
| 7,349,398 B1 | 3/2008 | Favor et al. | |
| 7,559,062 B2 | 7/2009 | Code et al. | |
| 7,620,054 B2 | 11/2009 | Katayama | |
| 7,661,130 B2 | 2/2010 | Hussain et al. | |
| 7,668,187 B2 * | 2/2010 | Shaikli | 370/412 |
| 8,559,439 B1 * | 10/2013 | Dongare et al. | 370/394 |
| 8,601,169 B1 * | 12/2013 | Paragaonkar et al. | 710/6 |
| 2012/0324462 A1 | 12/2012 | Miljanic et al. | |

* cited by examiner

*Primary Examiner* — Tammara Peyton
(74) *Attorney, Agent, or Firm* — Dennis R. Haszko

(57) ABSTRACT

A method and apparatus, such as multi-engine controller that can be used to control multiple data processing engines in a command based IO processing system, such as a storage controller, to solve to the problem of scaling the data processing rate to match the advances in the IO interface data rates, including a method of identifying dependencies among various tasks queued up in the system and scheduling tasks out-of-order to avoid head of line blocking, a method to buffer and reorder the completed tasks such that the task output order is the same as that in the input to the system.

13 Claims, 14 Drawing Sheets

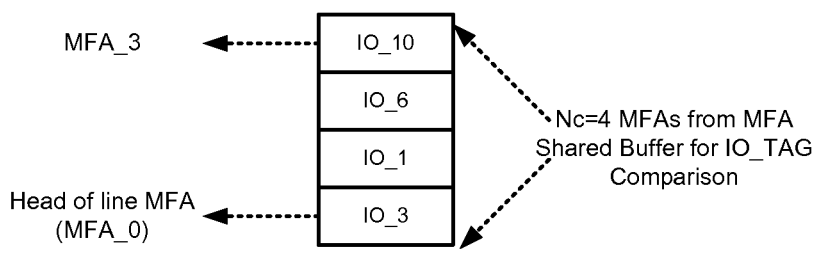
Figure 10A
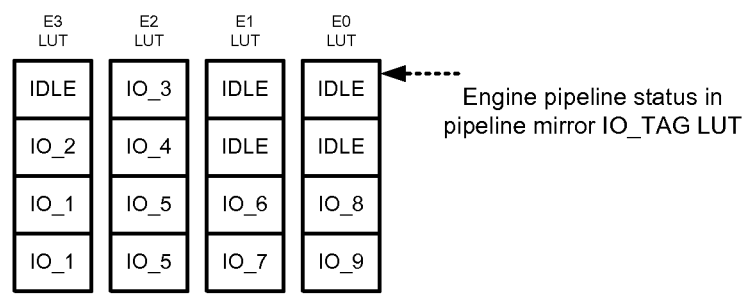
Figure 10B
|  | E3 | E2 | E1 | E0 |
|---|---|---|---|---|
| MFA_3 | 0 | 0 | 0 | 0 |
| MFA_2 | 0 | 0 | 1 | 0 |
| MFA_1 | 1 | 0 | 0 | 0 |
| MFA_0 | 0 | 1 | 0 | 0 |
Figure 10C
|  | E3 | E2 | E1 | E0 |
|---|---|---|---|---|
| MFA_3 | 1 | 0 | 1 | 1 |
| MFA_2 | 0 | 0 | 1 | 0 |
| MFA_1 | 1 | 0 | 0 | 0 |
| MFA_0 | 0 | 0 | 0 | 0 |
Figure 10D

METHOD AND APPARATUS FOR A MULTI-ENGINE DESCRIPTOR CONTROLLER FOR DISTRIBUTING DATA PROCESSING TASKS ACROSS THE ENGINES

CROSS-REFERENCE TO RELATED APPLICATIONS

This application is a continuation of U.S. application Ser. No. 13/288,619, filed Nov. 3, 2011, which application claims the benefit of priority of U.S. Provisional Patent Application No. 61/409,843, filed Nov. 3, 2010, the contents of which are incorporated herein by reference in their entirety.

FIELD

The present disclosure relates generally to storage controllers. More particularly, the present disclosure relates to multi-engine storage controllers.

BACKGROUND

Many applications may be running on the host and each application may require access to data on the hard drives. The data flow between a host application and the hard drives is referred to as an input/output (IO) operation. Storage controllers typically control the flow of data between a host and storage devices such as hard drives. Storage controllers perform data processing operations such as cyclical redundancy check (CRC) calculations for data integrity, encryption for security, parity calculation for RAID applications, etc. These data processing operations are usually done by dedicated hardware engines within the storage controller device.

The processing rate of the hardware engines determines the overall system IO processing rate. Simple bandwidth analysis reveals that the engines form the bottleneck. Consider an 8-lane PCIe Gen 3 link as the interface between the host and storage controller: PCIe bandwidth=8*(8 Gbps)=64 Gbps=8.0 GBps. Assuming that 95% of the PCIe bandwidth is used for actual data, the available bandwidth: Available PCIe bandwidth=0.95*8.0 GBps=7.6 GBps. Assuming 16 SAS 2.0 lanes as the interface between storage controller and the hard disks: SAS bandwidth=16*(6 Gbps)=96 Gbps=12 GBps. Assuming that 85% of the SAS bandwidth is used for actual data, the available bandwidth: Available SAS bandwidth=0.85*12 GBps=10.2 GBps. Now consider using a hardware engine for calculating a CRC Data Integrity field (DIF). If the engine has a 64-bit data bus and is operating at 300 MHz, then the maximum processing rate per engine=(8 B)*300 MHz=2.4 GBps. Thus the hardware engine is the performance bottleneck for a storage controller which works with high speed interfaces.

One way to address this performance bottleneck is to use multiple instances of the hardware engine such that the required processing bandwidth can be distributed across the multiple instances. Depending on the interface bandwidth, the system can be scaled to meet different performance requirements. For example, in an IO processing system which uses high speed interfaces, such as a PCIe (PCIe Gen 3, 8 Gbps) for host interface and SAS (SAS 2.0, 6 Gbps) for disk interface as described above, where the IO processing rate is limited by the speed of the data processing engine, multiple data processing engines can be integrated into the system to match the processing throughput with the interface throughput. In the above example, to meet the 7.6 GBps PCIe bandwidth, at least four instances of the hardware DIF engine would be required.

However, the use of multiple engines requires extra mechanisms to distribute the data processing tasks across the engines. In command based IO processing systems, this presents additional complexities of preserving IO coherency while distributing the processing across multiple engines. In such systems, the data flow is split into multiple small frames of data and separate commands are created by the IO processor (IOP) describing how each data frame needs to be processed. For example, consider an IO operation where 64 KB of raw data need to be transferred from host to disk and an 8 byte CRC DIF needs to be inserted after every 4 KB of data. For such an IO operation, the IOP, which controls the storage controller device, may initiate multiple DMA transfers, each transfer moving 1 KB of data from host memory into on-chip memory. The IOP will then create commands for the DIF engine to process each of the 1 KB data blocks. These commands are loaded into a command queue.

Since each 1 KB block represents a fraction of one full sector (4 KB) on which the CRC is to be calculated, there needs to be a global structure per IO operation called "IO context" which holds intermediate CRC results obtained after every 1 KB of data. The partial result at the end of the first 1 KB needs to be updated in the IO context before the second block can start processing. The CRC for the second block is calculated starting with the partial CRC obtained from the first block. This means that the commands of the same IO operation need to be processed in sequence. This also implies that the command scheduler should not schedule two commands of the same IO in parallel onto different DIF engine instances at the same time.

Since multiple applications are running in parallel on the host, there will typically be multiple IO operations requesting the same hardware operation. Thus the commands for different IO operations will be randomly interleaved in the command queue. In pure FIFO scheduling, the commands are popped out of the command queue and scheduled to free engines in order. This works well if all commands are independent of each other. However, in operations like CRC DIF computation, there are inherent dependencies between successive commands of the same IO flow. Hence, two commands belonging to the same IO operation cannot be scheduled onto different engines at the same time. This is shown in FIGS. 1A-1D. FIG. 1A shows a multi-engine system with four engines (E0-E3), and a command queue holding five commands from four separate IO flows (IO1-IO4), also referred to herein as input streams or input queues. The engines are non-pipelined. FIG. 1B shows a head of queue command (IO1_C1) scheduled on engine E0. In FIG. 10, a next command (IO2_C1) scheduled on engine E1. The next command in the command queue is IO2_C2, which cannot be scheduled until the processing of IO2_C1 has completed. As shown in FIG. 1D, the head of the line is blocked, and engines E2 and E3 remain idle until command IO2_C1 is processed. Thus, if the command at the head of the command queue cannot be scheduled because of IO dependency, then all other commands in the command FIFO will be blocked ("head of line blocking"). This results in engines being underutilized and wasted processing bandwidth.

Data processing engines also typically have internal pipeline stages to improve performance. A simple example of a data processing engine 100 with two pipeline stages is illustrated in FIG. 2. The processing engine 100 is command driven, and includes a command buffer stage 102, and a command execution stage 104, within a data processing block 106. A command fetch block (not shown) can fetch commands from the command memory 108 and feed the command into the engine 100. The commands are processed in the command execution stage 104 of the engine 100. While a command is being processed in the execution stage 104, the next command is buffered in the command buffer stage 102.

In addition to the pipeline stages inside the processing engine, there may be pipeline stages outside the engine. A command pre-fetch stage 110, and a command output stage 112, which can respectively buffer input commands and output commands, are shown.

The command memory ports may be shared by multiple masters and the access latency of the memory may vary based on the total number of requests that are active. In order to decouple the engine 100 from the variable latency of the command memory 108, additional pipeline stages may be added on the engine command interface. For example, a command pre-fetch stage 108 can be used to pre-fetch the command from the command memory 108 to decouple the engine 100 from the latency of the command memory 108. A command output stage 112 can be used to hold the completed command from the engine 100 until it is written into the output command memory 114.

A loopback path is generally provided for the IO context from the command execution stage 104 and the command output stage 112 to the command pre-fetch stage 110. If the command in the command pre-fetch stage 110 belongs to the same IO as that of the command in command execution stage 104, then the command pre-fetch stage 110 must wait until the processing completes in the command execution stage 104. After the command in command execution stage 104 completes, the IO context is updated and ready for use by command in command pre-fetch stage 110. The IO context can be internally looped back from command execution stage 104 to command pre-fetch stage 110 without having to write back to command memory 108. Similarly, if the command in command pre-fetch stage 110 and command output stage 112 are of the same IO, the IO context can be looped back from command output stage 112 to command pre-fetch stage 110. The pipeline architecture of the engines introduces additional complexities for scheduling commands.

It is, therefore, desirable to provide an improved method of scheduling commands in multi-engine system.

SUMMARY

In a first aspect, the present disclosure provides a method of processing commands in a multi-engine storage controller system. The method comprises: queuing, in order as received, input segments from multiple input streams, each input segment requiring an associated processing operation, including identifying the input stream to which each input segment belongs; for each input segment: determining if one of a plurality of processing engines of the multi-engine storage controller system is idle, and that no frame of the input stream to which the input segment belongs is currently scheduled on any other of the plurality of processing engines; and scheduling the input segment, for processing according to its associated processing operation, onto the idle one of a plurality of processing engines.

In another aspect, the present disclosure provides a multi-engine storage controller system. The system comprises a plurality of processing engines and a descriptor read controller including a command scheduler. The command scheduler is configured to schedule input segments from multiple input streams for processing on the plurality of processing engines, each input segment requiring an associated processing operation and including an identification of its respective input stream, the command scheduler determining, for each input segment, if one of the plurality of processing engines is idle, and that no frame of its respective input stream is currently scheduled on any other of the plurality of processing engines, and scheduling the input segment, for processing according to its associated processing operation, onto the idle one of a plurality of processing engines.

In another aspect, the present disclosure provides a non-transitory computer program product having a computer readable program code tangibly embodied therein which, when executed, causes a processor to perform the method of processing commands in a multi-engine storage controller system.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures:

FIGS. 10A-10D illustrate IO_TAG comparison according to an embodiment;

DETAILED DESCRIPTION

Figure 1A:
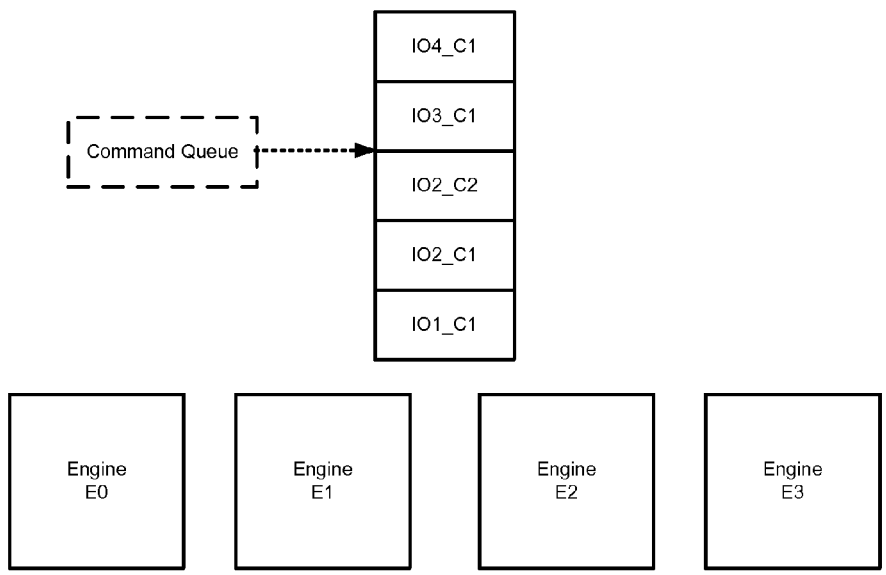
FIGS. 1A-1D illustrate head of line blocking in a multi-engine system.
Figure 1B:
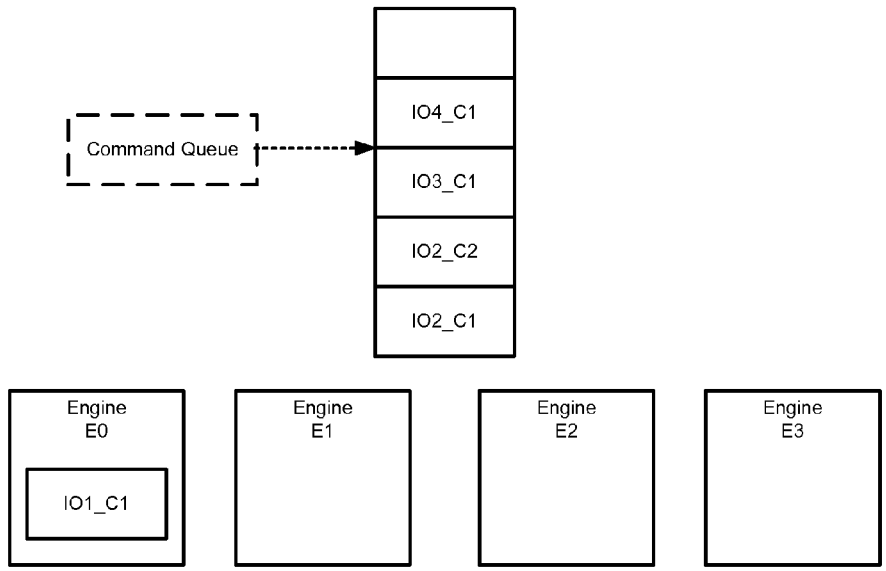
Figure 1C:
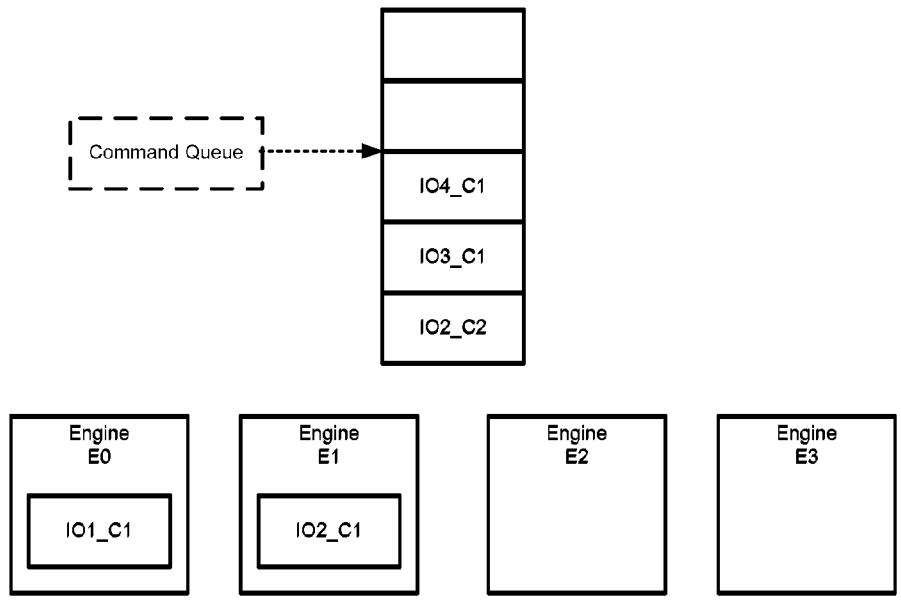
Figure 1D:
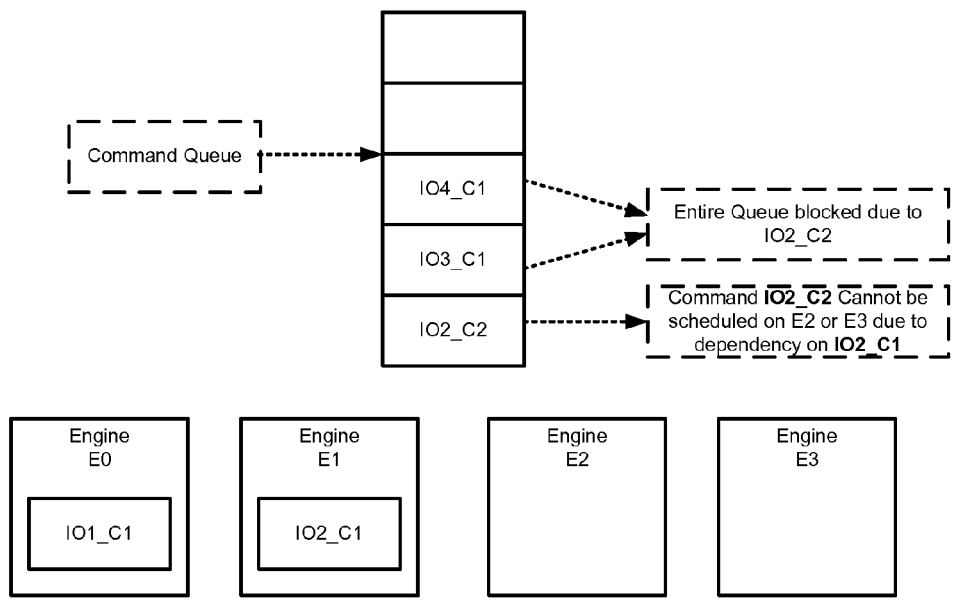
Figure 2:
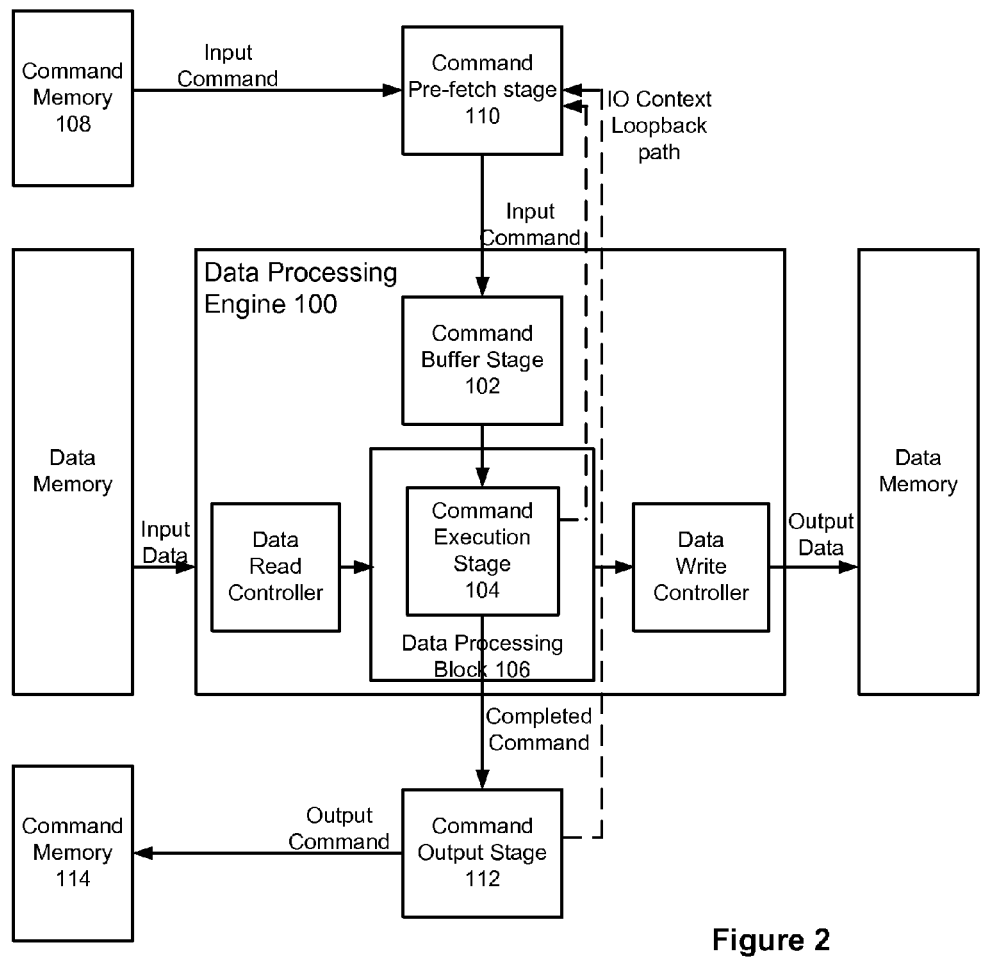
FIG. 2 shows an example of a four-stage pipelined data processing engine.

Generally, the present disclosure provides a method and apparatus to solve to the problem of scaling the data processing rate to match the advances in the IO interface data rates. The invention provides a method of identifying dependencies among various tasks queued up in the system and scheduling tasks out-of-order to avoid head of line blocking. The invention also provides a method to buffer and reorder the completed tasks such that the task output order is the same as that in the input to the system. In particular, a multi-engine controller engine is provided. The multi-engine controller can be used to control multiple data processing engines in a command based IO processing system. As used herein, an IO refers to the data flow between a host computer and a storage device, involving data processing operations such as encryption, CRC calculation, etc. The multi-engine controller engine can be used with different types of processing engines with different pipeline structures. Also, the number of processing engines connected to the descriptor controller can be scaled to match the IO data rates.

The present method is designed to be flexible and scalable to work with any number of engines and command queues. Depending on the interface bandwidth, the system can be scaled to meet different performance requirements. For example, in an IO processing system which uses high speed interfaces, such as a PCIe (PCIe Gen 3, 8 Gbps) for host interface and SAS (SAS 2.0, 6 Gbps) for disk interface, the IO processing rate is typically limited by the speed of the data processing engine. For example, the throughput of a single CRC Data Integrity Field (DIF) engine working at 300 MHz on a 64-bit data interface has a maximum throughput of 2.4 GBps. Hence, multiple data processing engines are integrated into the system to match the processing throughput with the interface throughput. In this case, to meet the 7.6 GBps PCIe bandwidth, at least four instances of the hardware DIF engine are required.

In a command based IO processing system, such as a storage controller, an IO operation involves reading data from an input device, such as a data memory, processing the data and writing out processed data to an output device. The data is transferred between the storage controller and the IO devices typically in the form of data frames. An IO transfer is split into multiple data frames and one command is created to process each frame. The size of a data frame can be different for different IO streams depending on the IO initiator.

A command queue is used to post the commands for each data frame. The commands of all IO streams that require a particular processing operation are loaded into a command queue dedicated to that operation. Multiple IO streams may be simultaneously active in the system, and hence the command queue will typically contain commands from different IO streams interleaved randomly. For example, commands of all IO streams requiring DIF calculation are loaded into a DIF command queue.

Figure 3:
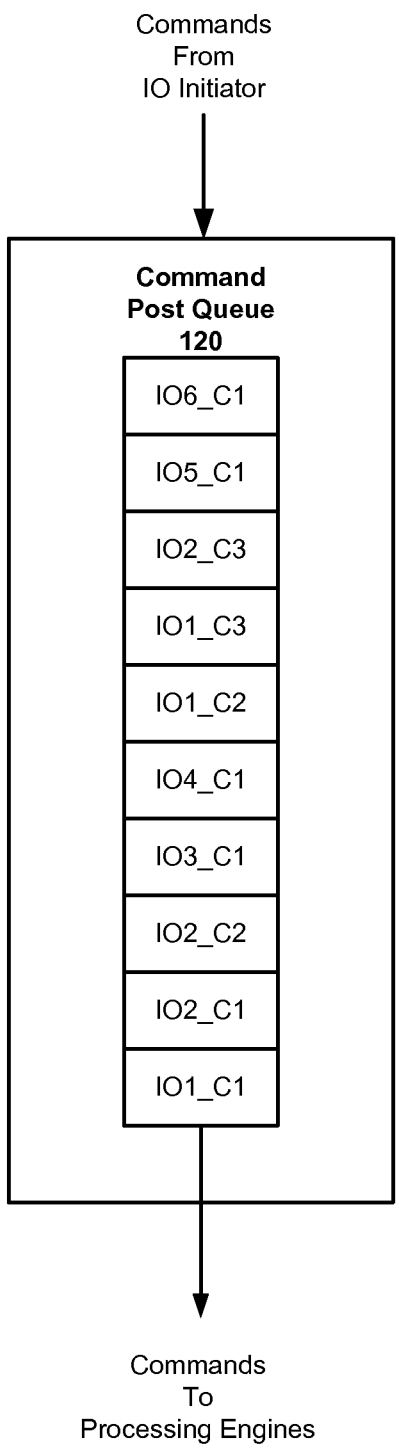
FIG. 3 shows commands from multiple IOs ordered randomly in the ingress command post queue.

FIG. 3 shows commands from multiple IO streams (IO1-IO6) ordered randomly in an ingress command post queue 120. The data frames, also referred to herein as input segments of an IO stream must be processed in sequence due to data dependencies between frames of an IO stream. Similarly, no two engines must process commands of the same IO stream at the same time. While strict ordering needs to be maintained during execution of commands belonging to the same IO stream, each IO stream is independent and no such ordering requirements exist between commands of different IOs.

Embodiments of the present multi-engine controller can be used to resolve dependencies between commands and schedule the commands so as to harness maximum bandwidth out of each engine. To process the commands of an IO stream in sequence and to achieve maximum processing throughput by efficiently scheduling commands of different IO streams across the multiple engines, out-of-order scheduling is used. Out-of-order scheduling is used to avoid head of the line blocking. The descriptor controller also incorporates mechanisms to re-order the commands completing out-of-order. In out-of-order scheduling, all commands in the command queue are scanned to find the best match for scheduling. This results in the commands completing out of order compared to the order in which the commands were initially stored in the ingress command post queue. The completed commands then need to be re-ordered by the controller and must be written back to the completion, or output, queue in the same order as they were in the ingress command post queue.

In an aspect, the present disclosure provides a method of processing commands in a multi-engine storage controller system. The method comprises queuing, in order as received, input segments from multiple input streams, each input segment requiring an associated processing operation, including identifying the input stream to which each input segment belongs. For each input segment, it is determined if one of a plurality of processing engines of the multi-engine storage controller system is idle, and that no frame of the input stream to which the input segment belongs is currently scheduled on any other of the plurality of processing engines. The input segment is scheduled, for processing according to its associated processing operation, onto the idle one of a plurality of processing engines. The scheduling of input segment of one of the multiple input streams may be independent of scheduling input segments of another of the multiple input streams.

In an example embodiment, the method further comprises reading command pointers associated with each of the multiple input streams to determine command descriptors associated with each input segment of each of the multiple input streams; and reading command descriptors and command contexts associated with each of the multiple input streams from a command memory. Reading pointers associated with each of the multiple input streams may be performed concurrently. The command pointers may be read from a command post queue. Reading the command descriptors and command contexts may comprise fetching the command descriptors and command contexts from a command memory in accordance with the command pointers.

In an example embodiment, the method further comprises updating the command pointers and command contexts after processing of the input segment by one of the plurality of processing engines to indicate completion of the processing operation.

In an example embodiment, the method further comprises writing updated command pointers and writing command contexts associated with each of the multiple input streams to the command memory; reordering processed input segments based on relative sequence within the input stream to which they belong; and writing the ordered processed input segments of the input stream to a command complete queue.

In another aspect, the present disclosure provides a multi-engine storage controller system. The system comprises a plurality of processing engines and a descriptor read controller including a command scheduler. The command scheduler is configured to schedule input segments from multiple input streams for processing on the plurality of processing engines, each input segment requiring an associated processing operation and including an identification of its respective input stream, the command scheduler determining, for each input segment, if one of the plurality of processing engines is idle, and that no frame of its respective input stream is currently scheduled on any other of the plurality of processing engines, and scheduling the input segment, for processing according to its associated processing operation, onto the idle one of a plurality of processing engines.

In an example embodiment, the descriptor read controller may further include a command read controller to read command pointers from a command post queue and provide the command pointers associated with each of the plurality of input segments to the command scheduler, and to read command descriptors and command contexts associated with each command pointer from a command memory, and provide the command descriptors and the command contexts to input buffers associated with each of the plurality of processing engines.

In an example embodiment, the command read controller may be configured to concurrently read pointers associated with each of the multiple input streams.

In an example embodiment, the command read controller may be configured to read the command descriptors and the command contexts by fetching the command descriptors and the command contexts from a command memory in accordance with the command pointers.

In an example embodiment, the system further comprises a descriptor write controller configured to update the command pointers and the command contexts after processing of the input segment by one of the plurality of processing engines to indicate completion of the processing operation.

In an example embodiment, the descriptor write controller may be configured to write the updated command pointers and the updated command contexts associated with each of the multiple input streams to the command memory; reorder processed input segments based on relative sequence within the input stream to which they belong; and write the ordered processed input segments of the input stream to a command complete queue.

Figure 4:
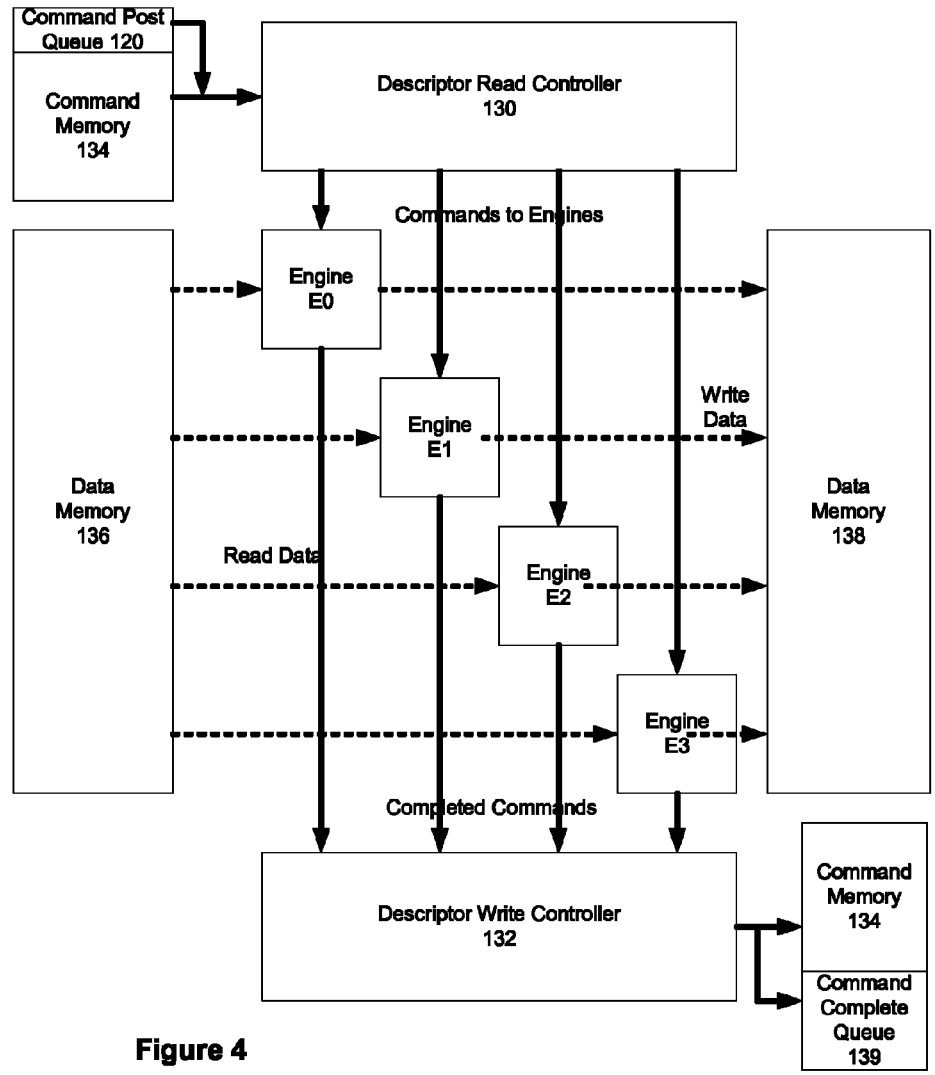
FIG. 4 shows a multi-engine IO processing system block diagram according to an embodiment.

An embodiment of the present system will now be described with reference to FIGS. 4-12. A block diagram of the multi-engine IO processing system, with four processing engines, is shown in FIG. 4. The multi-engine descriptor controller consists of two main sub-blocks a descriptor read controller 130, and a descriptor write controller 132.

The descriptor read controller 130 reads command pointers from the ingress command post queue 120, and reads the command descriptor, and IO contexts from the command memory 134. A command descriptor, or simply descriptor, specifies how data movement operations are to be executed. For example, a DMA descriptor is defined as a Message Frame (MF) and an address, or command, pointer to the MF is called a Message Frame Address (MFA). The MFA pointers, or MFAs, are written and read out of the messaging queues, and the MFs are stored in shared memory. According to embodiments, the descriptor read controller 130 can read multiple MFAs concurrently.

The descriptor read controller 130 schedules the commands onto the multiple engine instances (E0-E3) for processing. The engines process the commands by reading and writing data to the data memories 136, 138. After the commands are executed, the engines update the MFA and command descriptor with the status of execution of the command. The IO context is updated to reflect the status of the IO stream after each command in that IO stream is processed and written back to the command memory 134.

Once the command associated with an MFA has been processed by an engine, the processed MFA is fed to the descriptor write controller 132. The descriptor write controller 132 writes back the updated command descriptors and the updated IO context from the engines to the command memory 134, buffers and re-orders the completed MFAs based on sequence numbers, and writes the completed MFAs to the command complete queue 139 in order.

Figure 5:
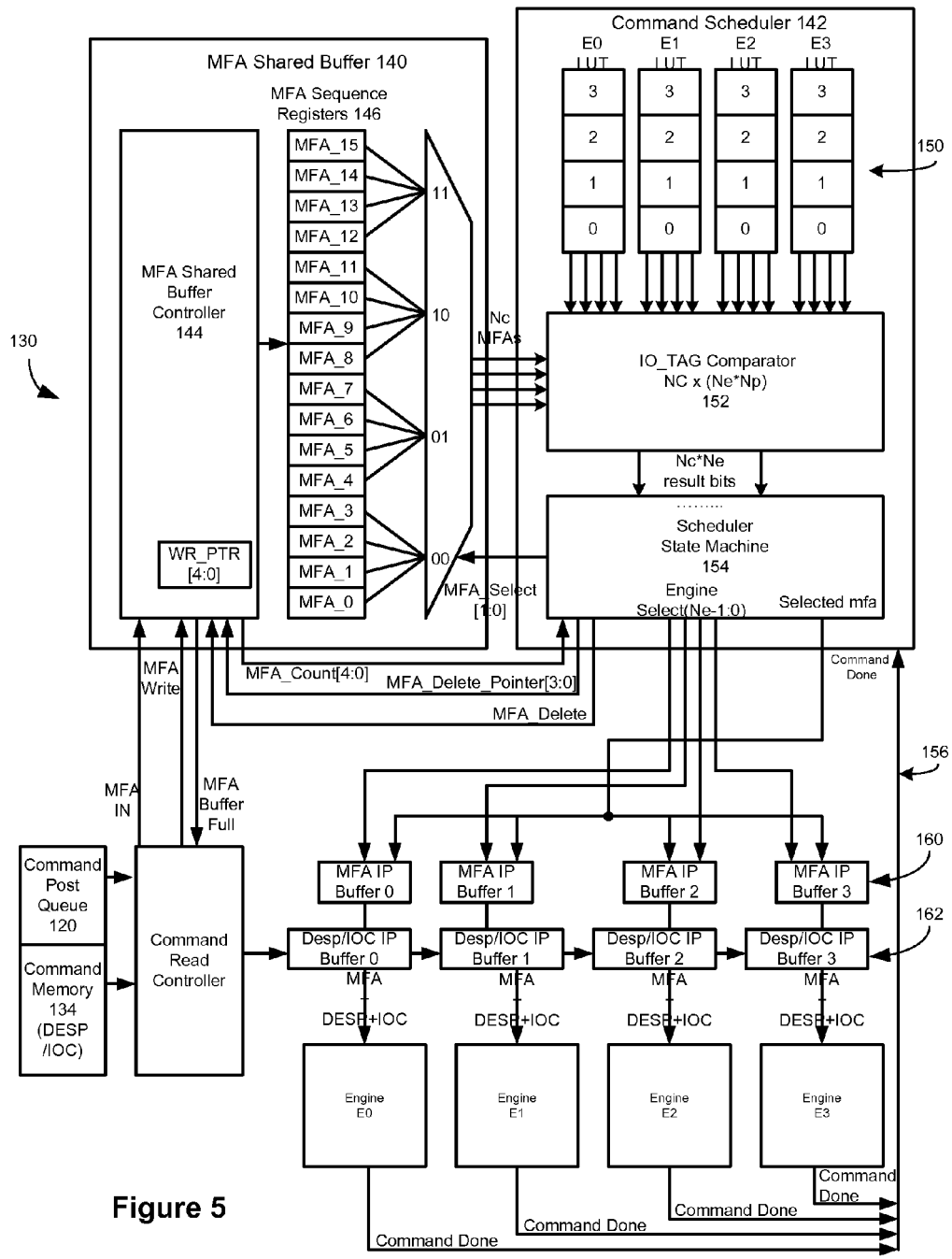
FIG. 5 is a descriptor read controller block diagram according to an embodiment.
Figure 6:
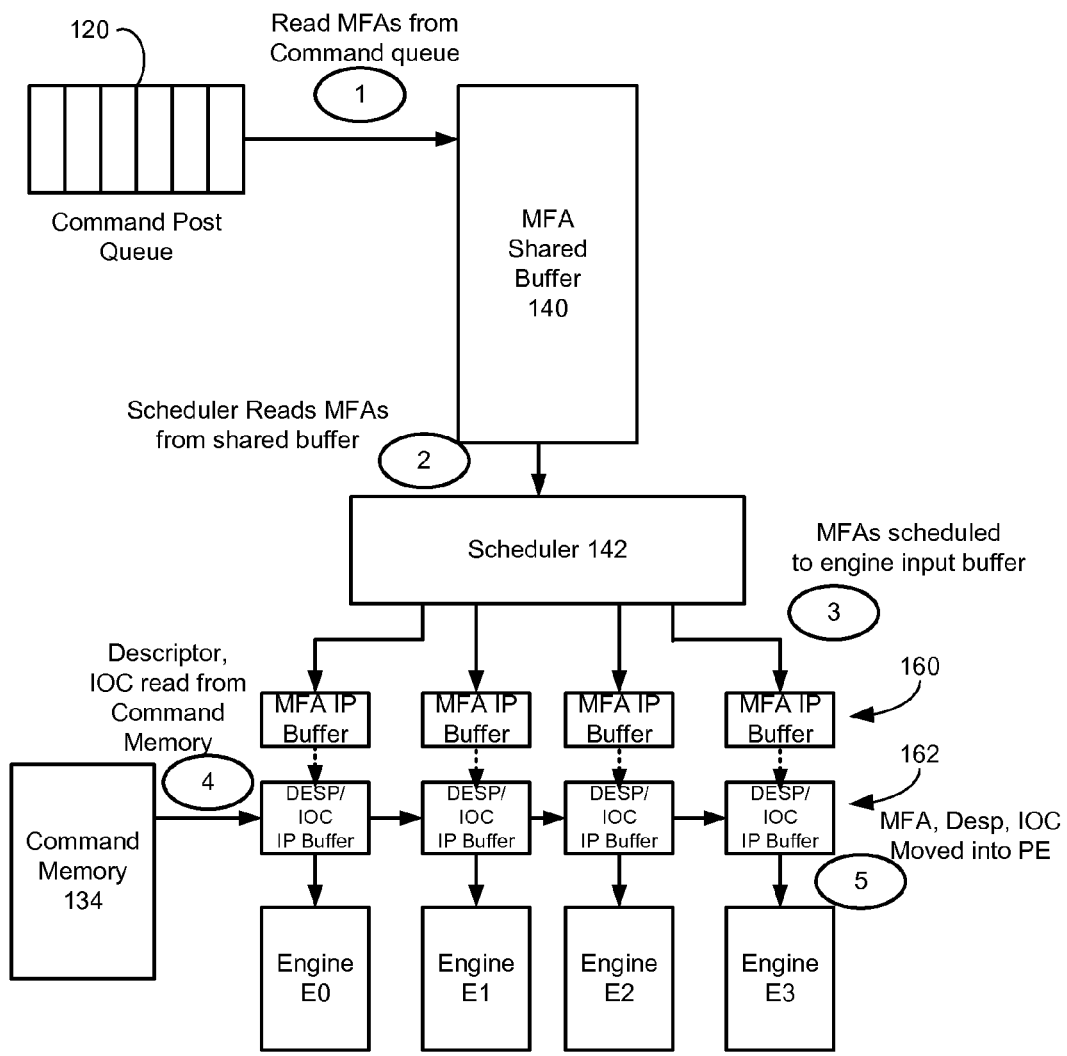
FIG. 6 is a descriptor read controller flow diagram according to an embodiment.

A detailed block diagram of an embodiment of the descriptor read controller 130 is shown in FIG. 5, and a flow diagram of the overall operation of the descriptor read controller is shown in FIG. 6. The descriptor read controller 130 consists generally of an MFA shared buffer 140 and a command scheduler 142. The descriptor read controller 130 has a dedicated read interface to the command memory 134 and to the ingress command post queues 120. The descriptor read controller 130 has blocks, as described in detail below, that fetch the MFAs from the ingress command post queue 120 and fetch command descriptors and IO contexts (DESP/IOC) from the command memory 134; buffer the MFAs internally; schedule the commands onto the multiple engine instances following the rules of command scheduling, and fetch the descriptors and IO contexts for the scheduled commands and load the command (MFA+DESP/IOC) into the engine for processing.

MFAs are read from the command post queue 120 to the MFA shared buffer 140. The scheduler 142 then reads the MFAs from the shared buffer 140, and schedules the commands on the engines E0-E3. One MFA input buffer 160 is provided for every engine instance. The MFA of the command scheduled to an engine is loaded into the MFA input buffer of that engine. The MFA contains the pointer to the command descriptor and also the pointer to the IO context. One descriptor/IO context input buffer 162 is also implemented for every engine instance. After an MFA is loaded into the MFA input buffer 160 by the scheduler 142, the descriptor and IO context corresponding to that MFA is fetched from command memory 134, and loaded into the descriptor/IO context input buffer 162.

Figure 7:
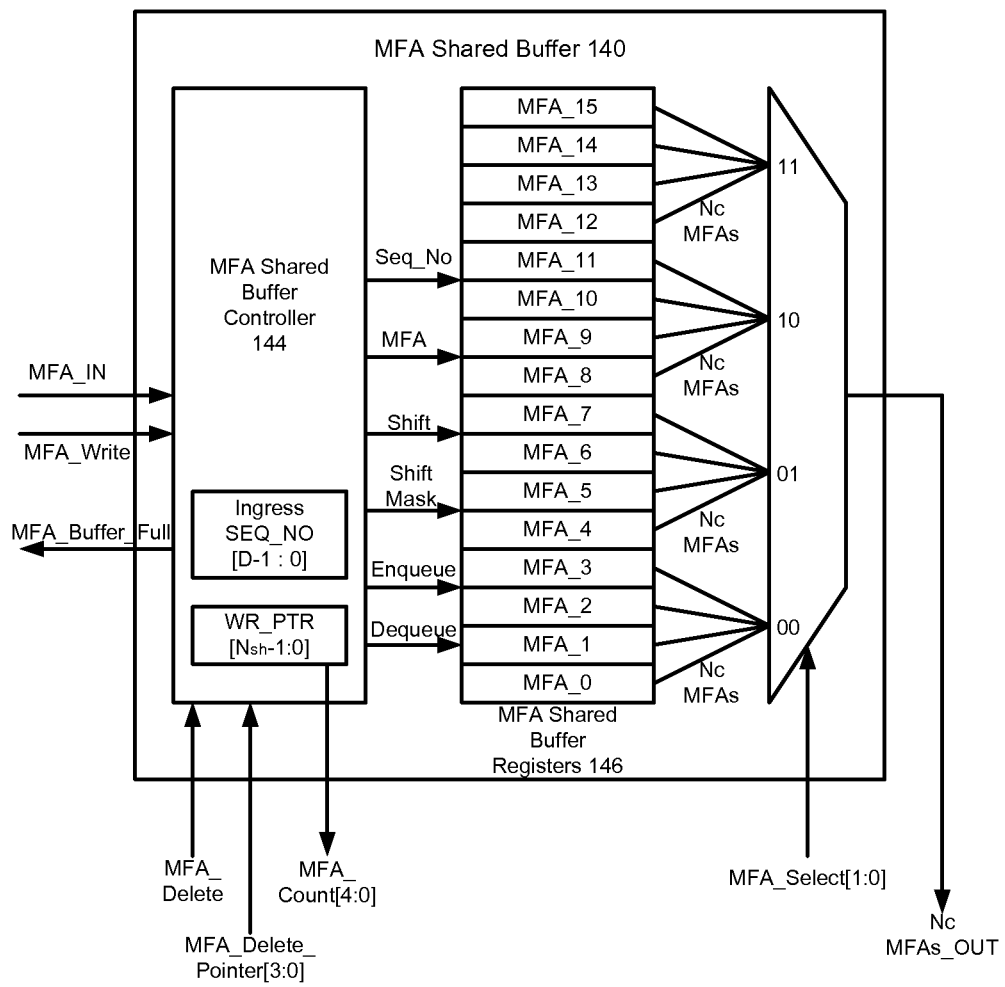
FIG. 7 shows details of the MFA shared buffer according to an embodiment.

A more detailed diagram of the MFA shared buffer 140 is shown in FIG. 7. The MFAs from the ingress command post queue are pre-fetched by the MFA shared buffer controller 144, and are stored in FIFO order in the MFA shared buffer registers 146. The MFA shared buffer controller 144 controls enqueuing, dequeuing and shifting operations in the MFA shared buffer registers 146. Each MFA, and hence each command, is assigned a sequence number when it is enqueued into the MFA shared buffer 140. The sequence number is used to indicate the order in which the MFAs were read from the ingress command post queue 120 (see FIG. 6). The sequence numbers are later used to re-order the MFAs at the egress interface.

The sequence number width is decided based on the maximum number of MFAs that can be present in the multi-engine descriptor controller system at any time. The total number of commands that can be present in the descriptor controller system is a function of MFA shared buffer depth (Nsh), pipeline depth of the processing engine (Np), number of processing engines in the system (Ne), and depth of the sequence buffers (Nsq). The maximum permissible number of MFAs in the system (Ntotal) can be calculated as:

$$Ntotal = Nsh + Ne*(Np + Nsq)$$

The width of the sequence number (D) is then chosen such that:

$$2^D > Ntotal$$

This will ensure that no two commands with the same sequence number are present at the same time in the system.

Referring again to FIGS. 5 and 6, the MFAs in the MFA shared buffer 140 are evaluated by the MFA scheduler 142 and the commands are then scheduled onto the engines (E0-E3) for processing. The MFA shared buffer 140 allows parallel access to multiple MFAs to the MFA scheduler 142. The number of MFAs to be accessed in parallel can be chosen as a design parameter based on gate count cost. One MFA is selected to be scheduled on an idle engine (i.e. an engine not currently engaged in processing a command) at a time. The selected MFA is dequeued from the MFA shared buffer 140 and is loaded into the selected engine's MFA input buffer 160 (MFA IP Buffers 0-3).

The command scheduler 142 is the central block of the descriptor read controller 130. The main function of command scheduler 142 is to schedule commands onto the engines and maximize the utilization factor of the engines. The command scheduler 142 reads MFAs from the shared buffer 140 and evaluates MFAs for scheduling onto idle engines. Three rules determine the command scheduling:

Ordering: Commands of the same IO must be scheduled in sequential order.

Mutual Exclusion: No two commands of the same IO must be executing simultaneously on more than one engine instance.

Re-ordering: The out-of-order scheduling must be done considering the depth of the re-ordering buffers at the egress interface.

The scheduler 142 evaluates the MFAs in the shared buffer 140. Nc MFAs are read concurrently from the shared buffer 140 and evaluated based on their IO_TAGs, identifying the IO to which they belong, and their sequence numbers. The MFAs are evaluated to determine the earliest command that can be dispatched for processing on an idle engine.

The scheduler 142 includes three main sub-blocks: an engine pipeline mirror 150 implemented as IO_TAG Look Up Tables (LUTs), an IO_TAG comparator 152, and an MFA scheduler state machine 154.

Figure 8:
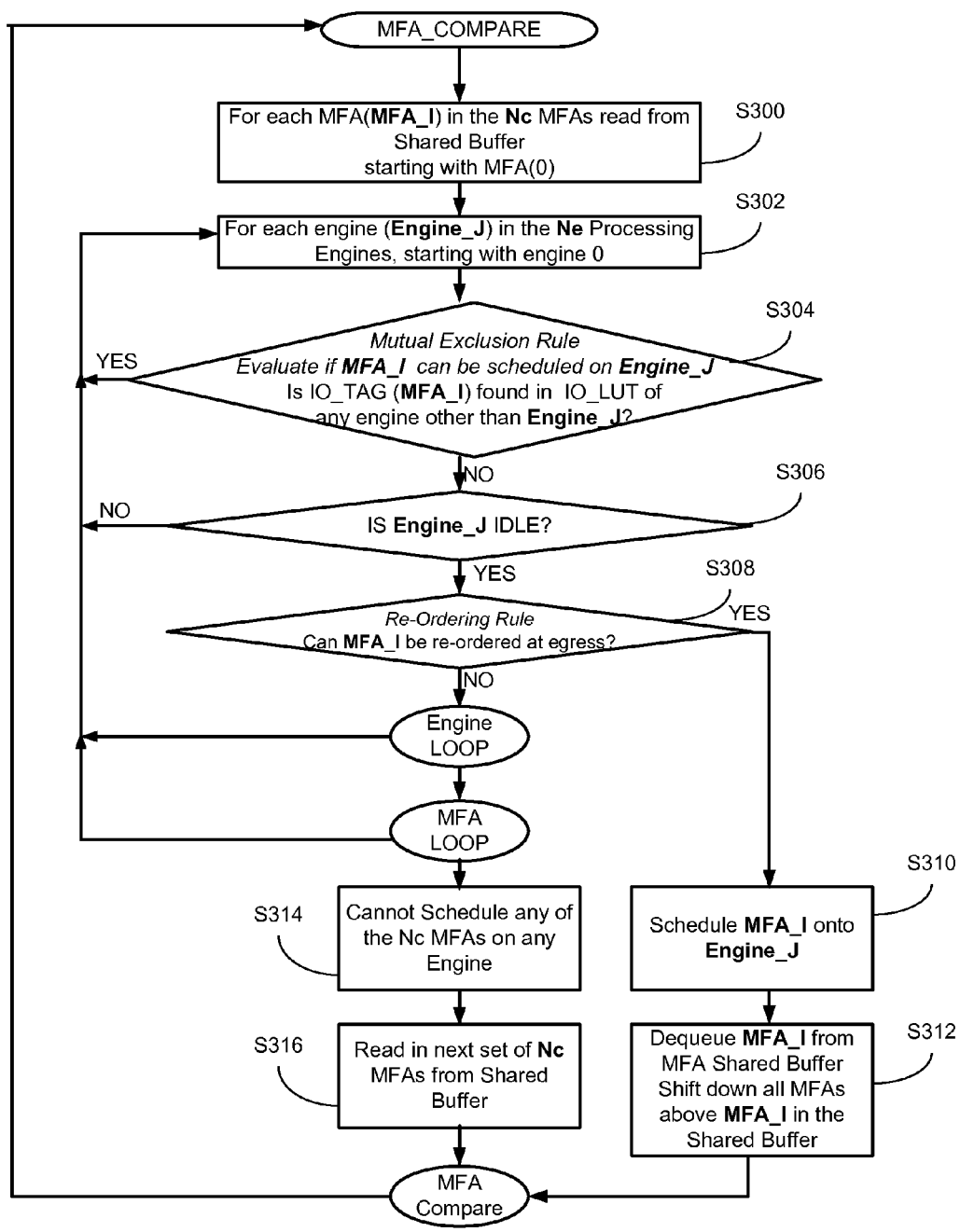
FIG. 8 is a flow chart of an MFA scheduling algorithm according to an embodiment.

An embodiment of the MFA scheduling algorithm is described with reference to the flow chart in FIG. 8. According to the ordering rule, the MFAs in the shared buffer 140 are evaluated in sequence (step S300), from MFA(0) to MFA (Nc), for each engine of the Ne engines (step S302) until an idle engine, satisfying the mutual exclusion and re-ordering rules, is identified onto which the command can be scheduled. An MFA is considered for evaluation if and only if none of the MFAs ahead of it in the shared buffer 140 satisfy a mutual exclusion rule (S304). According to the mutual exclusion rule (S304), the IO_TAG comparator 152 compares the IO_TAG of the ingress MFAs with those in the IO_TAG LUTs of the engines, which hold the IO_TAGs of the commands currently present in the engine pipeline stages. To determine if MFA_I can be scheduled on Engine_J, the IO_TAG of MFA_I is compared with the tags in the IO_TAG LUT of all engines other than Engine_J. If no matching tag is found, then MFA_I can be scheduled on Engine_J, provided Engine_J is idle (S306).

Figure 9:
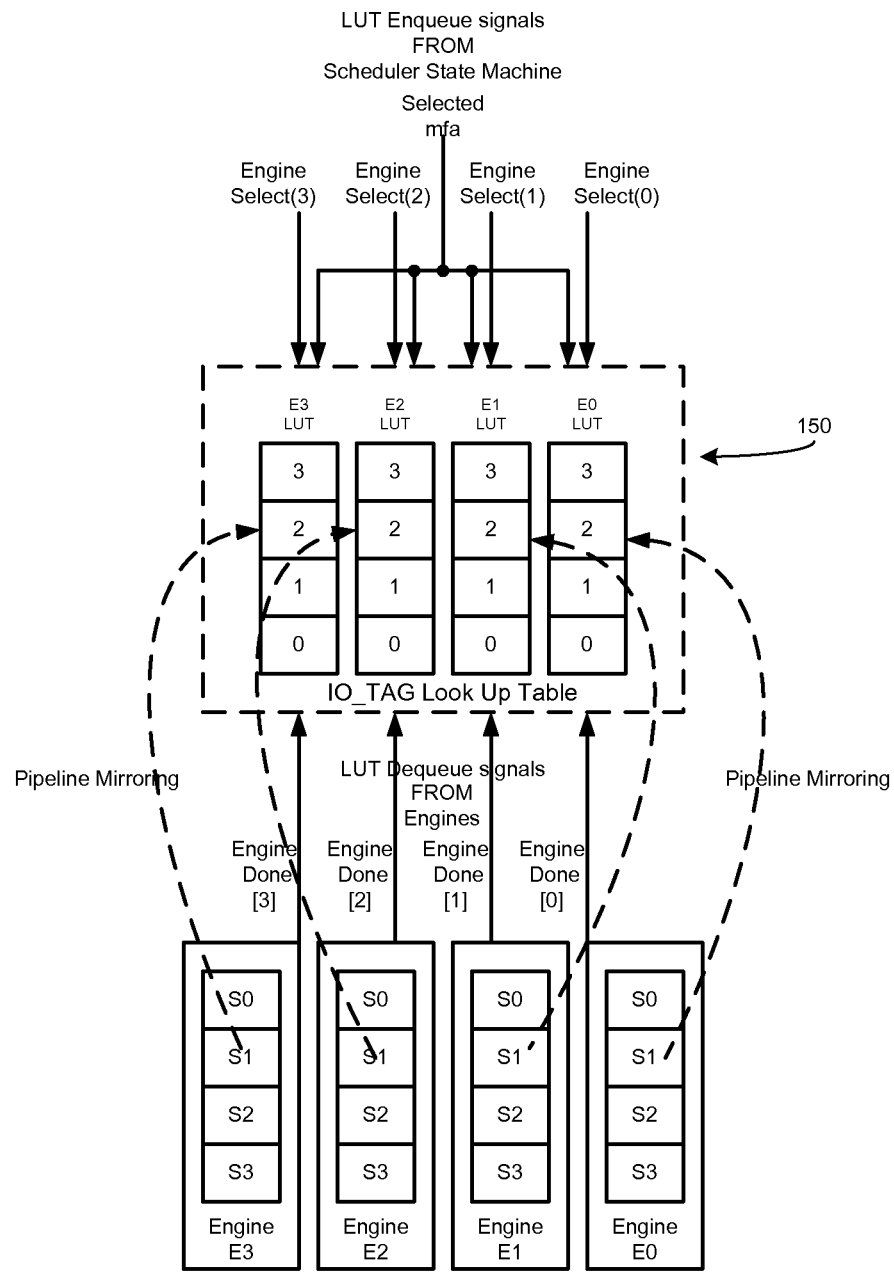
FIG. 9 shows engine pipeline mirroring in the IO_TAG Look up Tables.

The operation of the engine pipeline mirror 150 is shown in FIG. 9. The processing engines E0-E3 are internally pipelined. Each pipeline stage (S0-S3) holds one MFA. Consider a four-stage pipelined DIF Engine. Up to four MFAs from four different IOs can be present in the pipeline stages of an engine. The MFA scheduling algorithm needs the pipeline status information to perform scheduling. Particularly, the MFA scheduler 140 needs the IO_TAG of the MFAs in the pipeline stages of each engine. Since the processing engines may not have output ports that provide the status of their internal pipeline stages, the MFA scheduler needs to internally maintain a mirror of the engines' pipeline status. When an MFA is scheduled onto an engine, the IO_TAG of that MFA is pushed into the LUT of its respective engine. When an MFA completes processing on an engine (based on a "command done" feedback through feedback path 156 in FIG. 5), the last entry in the IO_TAG LUT of that engine is popped out.

The MFA scheduling is done primarily based on IO_TAG comparison performed by the IO_TAG comparator 152. As shown by example in FIGS. 10A-10D, the Nc MFAs are evaluated concurrently by the IO_TAG comparator. As shown in FIG. 10A, where Nc=4, four MFAs are present in the shared buffer 140. Each of the Nc IO_TAGs are compared against each of the Ne*Np MFAs, exemplified by the snapshot of the engine pipeline mirror in FIG. 10B. The total number of comparators in the IO_TAG comparator 152 is therefore Nc*Ne*Np. The comparison yields a Nc*Ne*Np bit compare result matrix indicating the presence or absence of an IO stream in each of the engines' pipeline stages. For each engine, the Np result bits are logically ORed to reduce the result vector from a 3D to a 2D matrix called an IO Status matrix, as shown in FIG. 10C. This 2D IO Status matrix indicates if the engine pipeline contains the same IO_TAG as those of the Nc incoming MFAs.

The mutual exclusion rule (see FIG. 8) is applied to the IO Status Matrix to derive another 2D matrix called the schedule matrix, as shown in FIG. 10D. This matrix shows which of the Nc incoming MFAs can be scheduled on which of the Ne engines. In both the IO Status matrix and the Schedule matrix, the rows represent the MFAs that are being evaluated and the columns represent the engines. In the IO Status matrix, if an element (i,j)='1', it implies that Engine_J contains an MFA of the same IO stream as that of incoming MFA_I; if (i,j)='0', it implies that Engine_J doe not contain an MFA of the same IO as that of incoming MFA_I. In the Schedule matrix, if an element (i,j)='1', it implies that MFA_I can be scheduled on Engine_J; if (i,j)='0', it implies that MFA_I cannot be scheduled on Engine_J due to mutual exclusion It should also be noted that the S0 stage of the engine pipeline needs to be idle for a scheduling to happen on that engine. Thus, only engines E0, E1 and E3, as depicted in FIG. 10B, are available for scheduling. Also, if an MFA of a new IO stream is equally likely to be scheduled on all idle engines. In such a case, the scheduler preferably chooses the lowest numbered engine which has maximum number of pipeline stages idle. For example, referring to FIG. 10D, the command associated with MFA_3 can be scheduled on E0, E1 and E3 and E0 will be chosen since it has two stages idle. The Schedule matrix in FIG. 10D further shows that the command associated with MFA_0 cannot currently be scheduled on any engine as E2 is BUSY, the command associated with MFA_1 can be scheduled on E3, the command associated with MFA_2 can be scheduled on E1 and the command associated with MFA_3 can be scheduled on E3, E1 or E0. Based on the ordering rule, the earliest MFA is given priority and thus the command associated with MFA_1 will be scheduled on E3 in the current MFA comparison.

The MFA scheduler state machine 154 controls the sequence in which the MFAs in the MFA shared buffer 140 are evaluated for scheduling. The state machine 154 consists of multiple MFA_COMPARE states, each state evaluating a set of Nc MFAs from the shared buffer 140. The Nc MFAs at the head of the shared buffer 140 are evaluated first. If no suitable MFA is found for scheduling, then the next set of Nc MFAs are evaluated. When an MFA is selected for scheduling on an engine, the selected MFA is dequeued from the shared buffer and is loaded into the engine pipeline S0 stage (see FIG. 9).

Figure 11:
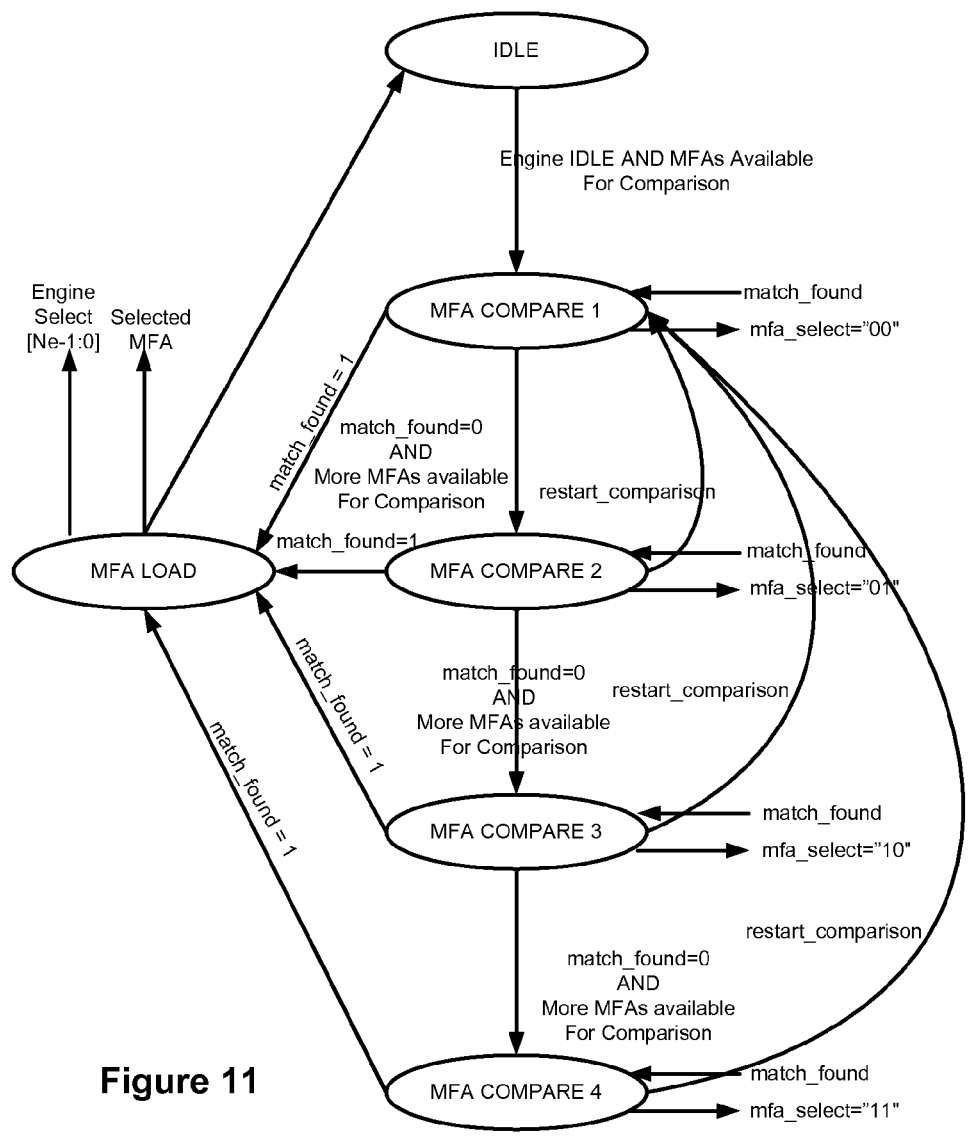
FIG. 11 shows a scheduler state machine diagram with four compare states according to an embodiment.

An example state diagram of the state machine 154 is shown in FIG. 11. This state diagram shows four MFA_COMPARE states. A total of 4*Nc MFAs are evaluated over four clocks. If no match is found in any of the compare states, then the state machine 154 waits for one of the engines' pipeline states to change (complete processing an MFA) and then restarts comparison.

Referring again to FIG. 8, a re-ordering rule is then applied (S308). The completed MFAs are buffered at the engine output in order to perform re-ordering. The number of out-of order MFAs that can be scheduled on an engine depends on the number of MFAs currently pending in the re-order buffer. As used herein, an "out-of-order" refers to the fact that, since frames are processed independently once scheduled on an engine, they may arrive at the egress interface out of order. These out-of-order frames need to be reordered at the destination according to their respective IO and sequence number. The re-ordering of out-of-order frames, particularly with reference to independent command processing, is described in greater detail in a co-pending application claiming the benefit of Application No. 61/409,860, filed Nov. 3, 2010, the contents of which are incorporated herein by reference in their entirety.

Generally, since commands are arbitrarily scheduled, the scheduler 142 must preferably ensure that the sequence buffers in the descriptor write controller 132 do not get filled with out-of order MFAs. Otherwise, the system will enter a deadlock situation where the egress is waiting for an in-order MFA, and the egress re-order buffer is filled with out-of-order MFAs. The operation of the descriptor write controller 132 and the sequence buffers is described in greater detail below with respect to FIG. 12.

The MFA at the head of the queue in the MFA shared buffer 140 is called an in-order MFA. All other MFAs are effectively out-of-order MFAs. If the in-order MFA satisfies the ordering and mutual exclusion rules, then that MFA can be scheduled immediately. On the other hand, if an out-of-order MFA satisfies the ordering and mutual exclusion rules, the status of the sequence buffer is checked to ensure that it does not get filled with out-of-order MFAs. The out-of-order MFA is scheduled only if it does not cause the sequence buffer to be filled. For example, if an out-of-order MFA satisfies the ordering and mutual exclusion rules, then the scheduler evaluates that MFA according to the re-ordering rule. The out-of-order MFA can be scheduled on an engine if (Nms+Nep)<(Nsq−1), where Nms=Number of MFAs in the MFA sequence buffer at the output of the engine; Nep=Number of MFAs currently active in the engine pipeline; and Nsq=Depth of the MFA sequence buffer. This ensures that scheduling an out-of-order MFA will not fill up the sequence buffer and will not cause a scheduler deadlock.

Assuming MFA(I) satisfies the re-ordering rule, MFA(I) is scheduled onto Engine_J (step S310), and dequeued from the MFA shared buffer 140 (step S312), whereupon the next MFA in the shared buffer is evaluated for scheduling. If MFA(I) fails to satisfy the re-ordering rule, the scheduling algorithm returns to the next MFA. If all Nc MFAs fail to satisfy the re-ordering rule, none can be scheduled on any engine (step S314), and the next set of Nc MFAs is read from the shared buffer (step S316) and evaluated for scheduling.

Figure 12:
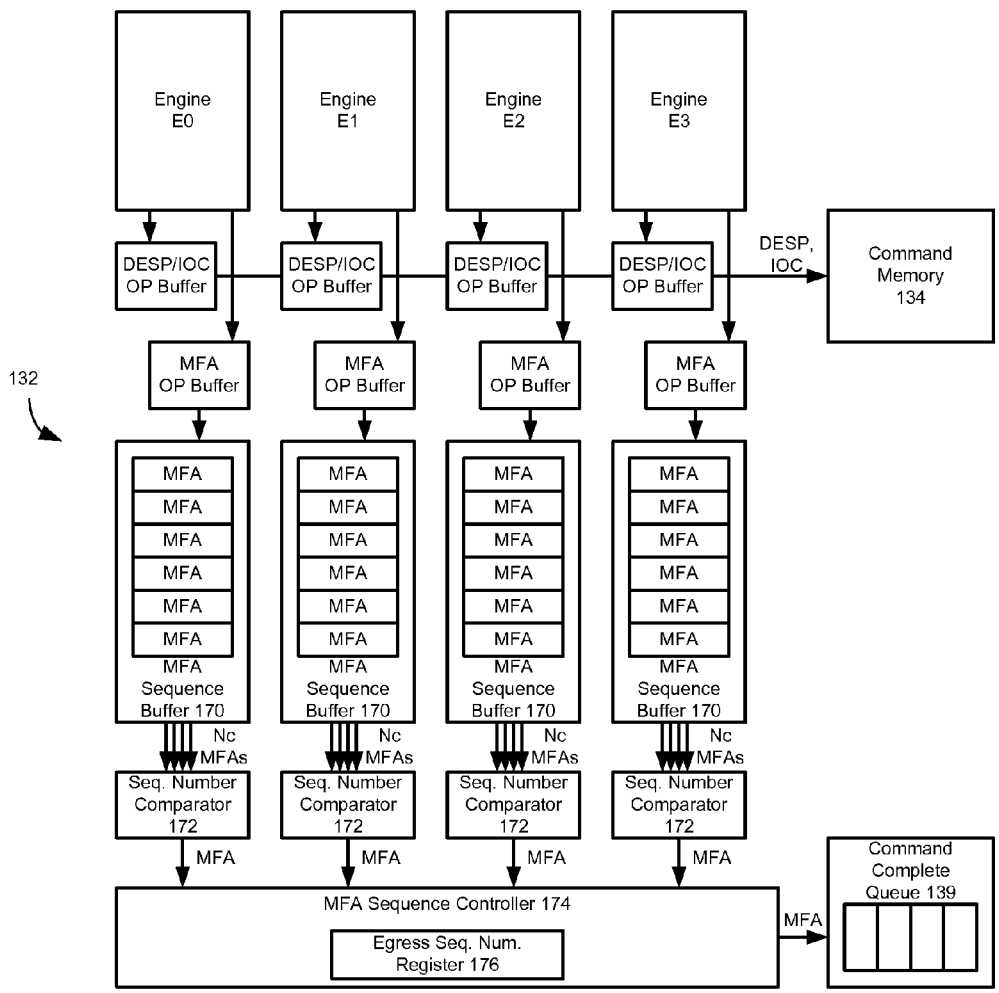
FIG. 12 is a descriptor write controller block diagram according to an embodiment.

Re-ordering of the MFAs is accomplished in the descriptor write controller 132, shown in detail in FIG. 12. MFA sequence buffers 170 buffer the completed MFAs out of the processing engines. The MFAs come out of the engines in the order in which they were scheduled onto them. The out-of-order MFAs are buffered in respective MFA sequence buffers 170 until they can be written out to the command complete queue 139. Each MFA sequence buffer 170 preferably provides parallel access to all the MFAs in it to the MFA sequence number comparator 172 to enable faster comparison of the sequence numbers. The depth of the MFA sequence buffer 170 (Nsq) determines the number of out-of-order MFAs that the system can handle. To avoid a deadlock, one location in the sequence buffer is reserved for an in-order MFA. Thus the maximum number of out-of-order MFAs that can be scheduled to an engine is (Nsq−1).

An MFA sequence controller 174 implements the egress sequence number controller 176, which holds the sequence number that is next in line to be written back to the command complete queue 139. The egress sequence number register 176 is read by the sequence number comparators 172 to search the MFA sequence buffers 170. When a sequence number comparator 172 finds a matching sequence number, the corresponding MFA is dequeued from the MFA sequence buffer 170 and loaded into the MFA sequence controller 174. The MFA is then written back to the command complete queue 139, and the egress sequence number register 176 is incremented to reflect every MFA that is written back to the complete queue 139.

Each sequence number comparator 172 implements the sequence number comparator instances required to compare the egress sequence number register 176 with the sequence number of the MFAs in the MFA shared buffer registers 146. Nc comparator instances can implemented to compare Nc MFAs in parallel. When a matching sequence number is found in the MFA sequence buffers 170, the comparator indicates the position of the matching MFA to the MFA sequence controller 174. The MFA sequence controller 174 then dequeues the MFA and writes it out to the command complete queue 139.

Figure 13:
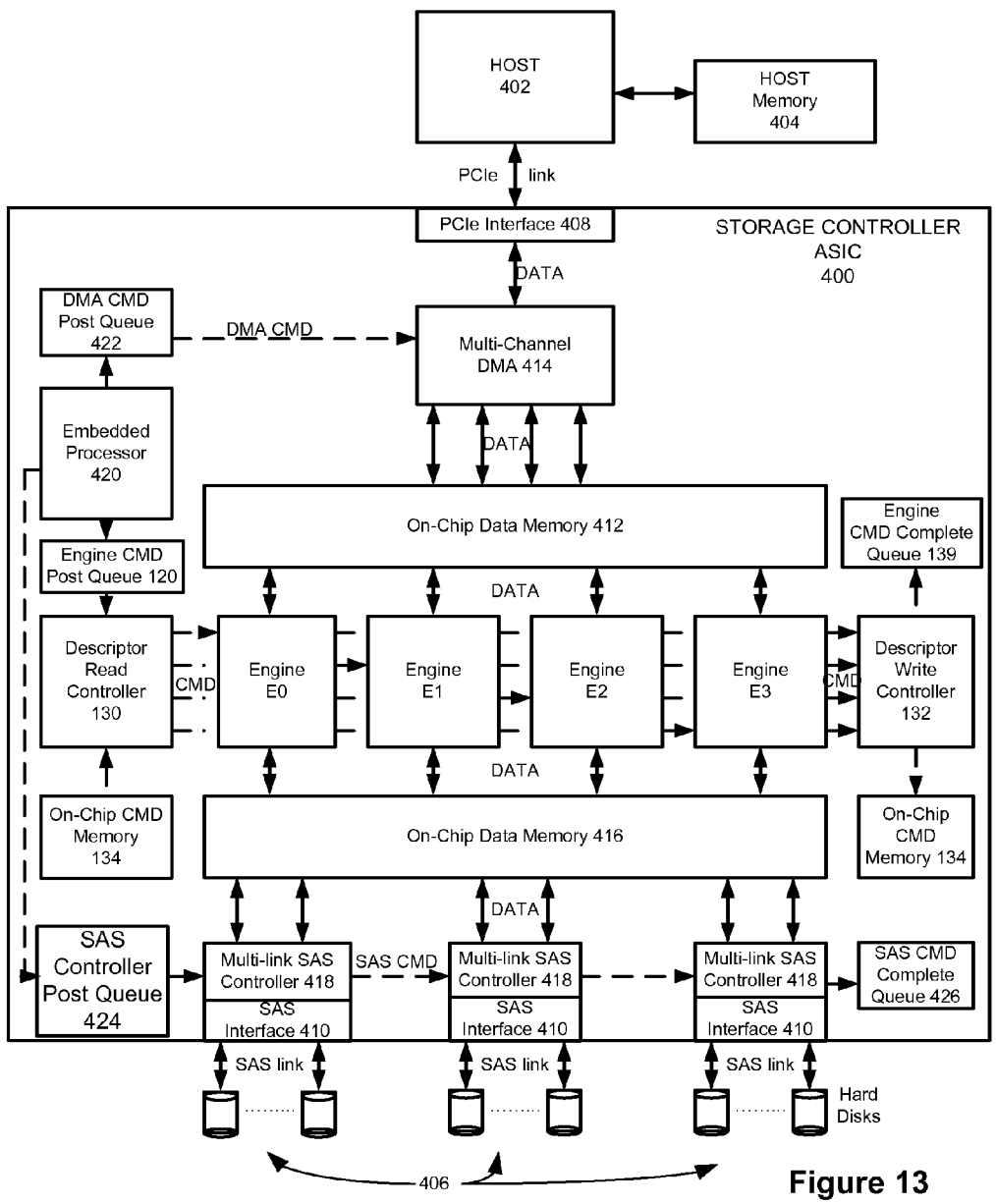
FIG. 13 is a block diagram of a multi-engine descriptor controller in a storage controller according to an embodiment.

FIG. 13 illustrates an embodiment of the multi-engine descriptor controller as a storage controller ASIC 400. The storage controller 400 connects a host 402, having host memory 404, to data storage devices 406, such as hard disks. Dedicated hardware engines E0-E3 are designed to perform the data processing functions, such as RAID, DIF, encryption, etc. The storage controller 400 connects to the host 402 through a PCIe interface 408 and to the hard disks 406 through SAS interfaces 410. A typical IO operation involves writing data from the host memory 404 to the hard disks 406. The storage controller ASIC 400 has to calculate and append CRC to the data sector before writing it to the hard disks 406. The interface speeds of the PCIe and SAS links are much higher than the speed at which the CRC can be calculated by one DIF engine. Hence multiple DIF engines (E0-E3) are added to the storage controller 400.

The data is first moved from the external host memory 404 to the on-chip data memory 412 through the PCIe interface 408 and a multi-channel DMA block 414, in multiple transfers of data frames. The engines operate on the data frames and write back the processed frames to the data memory 416. The SAS controllers 418 then move the processed data to the hard disks 406. An embedded processor 420 inside the ASIC 400 synchronizes the various activities that take place for every frame of data transferred from host 402 to hard disks 406. The processor 420 communicates with the hardware blocks through respective command queues. In the above example, for every data frame transferred, the processor 420 posts a DMA command in DMA post queue 422 initiating data move from host memory 404 to on-chip data memory 412. The multi-channel DMA 414 then completes the transfer and posts completion to a DMA complete queue (not shown). The processor 420 is triggered upon DMA completion, and posts a command to the engine command post queue 120 initiating data processing. Once the engine posts completion to command complete queue 139, the processor 420 is again triggered, and posts the command to a SAS controller post queue 424, initiating a data write to hard disks 406. The respective SAS controller 418 finishes and posts completion to a SAS complete queue 426, indicating an end of a data frame transfer. As the number of IOs requested by the host computer increases, the commands will be randomly posted into the command queue 120, and as described above, are efficiently distributed to the multiple engines by the descriptor read controller 130.

While the present invention has been described in relation to a storage controller system where the controller processes data between a host and a data storage system, it is equally applicable to many different systems where data processing has to be distributed across multiple processing elements to match the IO throughput with the processing throughput.

The present invention provides a mechanism to identify the dependencies between the data processing tasks that are queued up and schedule the tasks to extract maximum processing throughput out of the multiple engines. The invention also provides output buffering on the completed tasks to perform reordering in order to ensure that the task completion is posted out of the system in the same order as they entered.

Operations on the same data flow are not allowed to be executed in parallel due to data dependency. The scheduler implements an IO_TAG lookup table and IO_TAG comparators to ensure operations on the same flow are not executed in parallel. Only operations on different IOs are scheduled in parallel. However, the MFAs from different IOs are not required to be assigned to any particular processing engine. The scheduler dynamically schedules MFAs from different IOs based on the current status of the engines. This allows better scheduling performance as opposed to static allocation of IOs to engines.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. Embodiments described herein are generally implemented as a hardware circuit, or a combination of hardware and software or firmware. Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can software or firmware containing various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of processing commands in a multi-engine storage controller system, comprising:
   queuing, in order as received, input segments from multiple input streams, each input segment requiring an associated processing operation, including identifying the input stream to which each input segment belongs;
   for each input segment:
      determining if one of a plurality of processing engines of the multi-engine storage controller system is idle, and that no frame of the input stream to which the input segment belongs is currently scheduled on any other of the plurality of processing engines; and
      scheduling the input segment, for processing according to its associated processing operation, onto the idle one of a plurality of processing engines.

2. The method of claim 1, wherein scheduling the input segment of one of the multiple input streams is independent of scheduling input segments of another of the multiple input streams.

3. The method of claim 1, wherein reading pointers associated with each of the multiple input streams is performed concurrently.

4. The method of claim 1, wherein reading the command pointers comprises reading command pointers from a command post queue.

5. The method of claim 1, wherein reading the command descriptors and command contexts comprises fetching the command descriptors and command contexts from a command memory in accordance with the command pointers.

6. The method of claim 1, further comprising:
   updating the command pointers and command contexts after processing of the input segment by one of the plurality of processing engines to indicate completion of the processing operation;
   wherein the descriptor read controller further includes a command read controller to read command pointers from a command post queue and provide the command pointers associated with each of the plurality of input segments to the command scheduler, and to read command descriptors and command contexts associated with each command pointer from a command memory, and provide the command descriptors and the command contexts to input buffers associated with each of the plurality of processing engines.

7. The method of claim 6, further comprising:
   writing updated command pointers and writing command contexts associated with each of the multiple input streams to the command memory;
   reordering processed input segments based on relative sequence within the input stream to which they belong; and
   writing the ordered processed input segments of the input stream to a command complete queue.

8. A multi-engine storage controller system, comprising:
   a plurality of processing engines;
   a descriptor read controller including:
      a command scheduler configured to schedule input segments from multiple input streams for processing on the plurality of processing engines, each input segment requiring an associated processing operation and including an identification of its respective input stream, the command scheduler determining, for each input segment, if one of the plurality of processing engines is idle, and that no frame of its respective input stream is currently scheduled on any other of the plurality of processing engines, and scheduling the input segment, for processing according to its associated processing operation, onto the idle one of a plurality of processing engines.

9. The system of claim 8, wherein the command read controller is configured to concurrently read pointers associated with each of the multiple input streams.

10. The system of claim 8, wherein the command read controller is configured to read the command descriptors and the command contexts by fetching the command descriptors and the command contexts from a command memory in accordance with the command pointers.

11. The system of claim 8, further comprising a descriptor write controller configured to update the command pointers and the command contexts after processing of the input segment by one of the plurality of processing engines to indicate completion of the processing operation.

12. The system of claim 11, wherein the descriptor write controller is configured to:
- write the updated command pointers and the updated command contexts associated with each of the multiple input streams to the command memory;
- reorder processed input segments based on relative sequence within the input stream to which they belong; and
- write the ordered processed input segments of the input stream to a command complete queue.

13. A non-transitory computer program product having a computer readable program code tangibly embodied therein which, when executed, causes a processor to perform the method of claim 1.

* * * * *